(12) United States Patent
Howells et al.

(10) Patent No.: US 8,165,289 B2
(45) Date of Patent: Apr. 24, 2012

(54) METHOD AND APPARATUS FOR THE GENERATION OF CODE FROM PATTERN FEATURES

(75) Inventors: William Garreth James Howells, Whitstable (GB); Michael Christopher Fairhurst, Canterbury (GB); Farzin Deravi, Canterbury (GB)

(73) Assignee: University of Kent, Kent (GB)

( * ) Notice: Subject to any disclaimer, the term of this patent is extended or adjusted under 35 U.S.C. 154(b) by 298 days.

(21) Appl. No.: 12/307,577

(22) PCT Filed: Jul. 3, 2007

(86) PCT No.: PCT/GB2007/002471
§ 371 (c)(1),
(2), (4) Date: Nov. 12, 2009

(87) PCT Pub. No.: WO2008/003945
PCT Pub. Date: Jan. 10, 2008

(65) Prior Publication Data
US 2010/0074439 A1 Mar. 25, 2010

(30) Foreign Application Priority Data
Jul. 6, 2006 (GB) .................................. 0613482.9

(51) Int. Cl.
*H04L 9/00* (2006.01)
*H04L 29/06* (2006.01)
*G06F 21/00* (2006.01)

(52) U.S. Cl. ......................................... 380/44; 380/115

(58) Field of Classification Search .................. None
See application file for complete search history.

(56) References Cited

U.S. PATENT DOCUMENTS

| 7,162,035 B1 * | 1/2007 | Durst et al. ..................... 380/54 |
| 2004/0148509 A1 * | 7/2004 | Wu ............................... 713/186 |
| 2006/0104484 A1 * | 5/2006 | Bolle et al. .................... 382/115 |

FOREIGN PATENT DOCUMENTS

| WO | WO 00/14716 A1 | 3/2000 |
| WO | WO 2005/122467 A1 | 12/2005 |

OTHER PUBLICATIONS

Chang, Y.-J., et al., "Biometrics-Based Cryptographic Key Generation," IEEE International Conference on Multimedia and Expo (ICME) (2004) pp. 2203-2206.
Connie, T., et al., "PalmHashing: a novel approach for dual-factor authentication," Pattern Analysis and Applications, vol. 7 (2004) pp. 255-268.
Feng, H., et al., "Private key generation from on-line handwritten signatures," Information Management and Computer Society, vol. 10, No. 4 (2002) pp. 159-164.
Vielhauer, C., et al., "Handwriting: Feature Correlation Analysis for Biometric Hashes," EURASIP Journal of Applied Signal Processing, vol. 4 (2004) pp. 542-558.

* cited by examiner

Primary Examiner — Nathan Flynn
Assistant Examiner — Trang Doan
(74) Attorney, Agent, or Firm — Blakely, Sokoloff, Taylor & Zafman

(57) ABSTRACT

A method is provided for deriving a single code from a biometric sample in a way which enables different samples of a user to provide the same code whilst also distinguishing between samples of different users. Different features are analysed to obtain mean and variance values, and these are used to control how the different feature values are interpreted. In addition, features are combined and a sub-set of bits of the combination is used as the code. This enables bits which are common to all user samples to be dropped as well as bits which may differ between different samples of the same user.

9 Claims, 1 Drawing Sheet

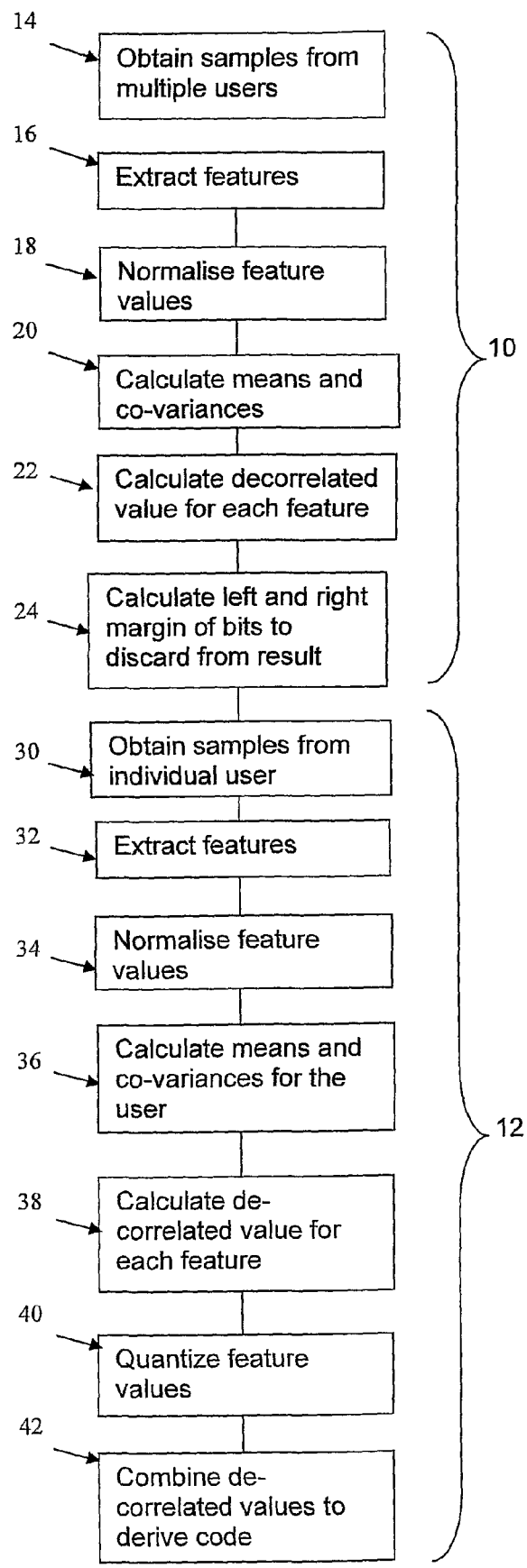

METHOD AND APPARATUS FOR THE GENERATION OF CODE FROM PATTERN FEATURES

This is a non-provisional application claiming the benefit of International application number PCT/GB2007/002471 filed Jul. 3, 2007.

FIELD OF THE INVENTION

This invention relates to the generation of code from pattern features, for example code which can be used for security purposes, for example for use in encryption systems.

BACKGROUND OF THE INVENTION

Data encryption is a fundamental tool for the protection of electronically-mediated data, and involves the use of encryption keys. Different systems operate in different ways, typically a communication involves the exchange of public keys which are employed to encrypt data subsequently decrypted by private keys. These encryption systems cannot necessarily protect against fraudulent data manipulation when the security of the private encryption keys cannot be absolutely guaranteed.

In conventional encryption systems, using public and private keys, a user needs to store their private key for use during the communications procedure, to enable it to be retrieved and exchanged during communications. It is this storage of the private key which can give rise to security implications.

Biometric security systems are becoming of increasing interest, in which biometric data (such as fingerprints, retina scans, written signatures, voice profiles) are used as a means for verifying user identity.

Systems using such data of course need to maintain a database of the profiles of the valid users, in the form of biometric templates encapsulating data relating to the given biometric for each required user. Access to the biometric templates by an unauthorised user or system administrator may be used to obtain the data necessary for circumventing the security afforded by the biometric system.

The stored data is also personal to the users, and there may therefore be some user reluctance to provide biometric samples which will be used to generate templates to be stored within a system.

SUMMARY OF THE INVENTION

According to the invention, there is provided a method of generating a code from a set of samples, each sample in the form of a pattern, comprising:
  (i) analysing a plurality of samples and obtaining feature values for the samples, each sample being interpreted as a plurality of features;
  (ii) normalising the feature values by adapting the feature values such that they may each take only a predetermined range of values, each with substantially equal likelihood;
  (iii) obtaining mean, variance and covariance values for the different features from the plurality of samples;
  (iv) setting quantization levels for each feature using the obtained mean and variance values, the quantization levels determining the range of feature values to be considered as equivalent;
  (v) de-correlating the feature values using de-correlating coefficients obtained from the covariance values: and
  (vi) deriving a single code from a combination of the feature values, wherein the single code comprises a sub-set of the bits derived from the combination of feature values.

The invention provides a method for deriving a single code from a biometric sample in a way which enables different samples of a user to provide the same code whilst also distinguishing between samples of different users. Different features are analysed to obtain mean and variance values, and these are used to control how the different feature values are interpreted. In addition, features are combined and a sub-set of bits of the combination is used as the code. This enables bits which are common to all user samples to be dropped as well as bits which may differ between different samples of the same user.

Normalising the feature values enables each feature to be made (statistically) equally significant. The normalising may also comprise applying a quantization to feature values which have continuously variable values.

The method can be used as part of a template-free encoding system, which exploits the potential of biometric identity information to authenticate activation of an encryption process. One primary application of the method of the invention is thus to improve data security via the generation of encryption keys directly from biometrically based data.

Such a system possesses the significant advantage of removing the need to store any form of information regarding the biometric itself (known as a template) for validating the user, hence directly addressing problems associated with existing systems. The security of the system can then be as strong as the biometric and encryption algorithm employed, as there is no risk of access to stored data. The only mechanisms to gain subsequent access are to provide another sample of the biometric or to break the cipher employed by the encryption technology.

Preferably, the method can be used in an asymmetric encryption system. Traditional systems require that the private key for decrypting data be stored in some way, as memorising a private key is not feasible. The use of the method of the invention enables the key to be uniquely associated with the given biometric sample and a further biometric sample is thus required to generate the required private key. It is then possible to avoid any physical record of the key, and it is not possible to compromise the security of sensitive data via unauthorised access to the storage device containing the key.

This application of the method of the invention also has the advantage that any compromise of the system security does not release sensitive biometric template data which would allow unauthorised access to other systems protected by the same biometric or indeed any system protected by any other biometric templates present.

The process for deriving a single value preferably comprises:
  obtaining a de-correlated feature value for each feature; and
  combining the de-correlated feature values.

The use of decorrelated feature values means that the values of one feature cannot be estimated based on correlations with other features. By removing the correlations between features, the security of the system is improved.

Obtaining a de-correlated feature value may comprise combining the co-variance values for the feature with each other feature. A set of combined de-correlated feature values may be obtained, with one combined feature value for each sample.

The de-correlated set of values may then be combined using a fold operation to combine the de-correlated feature values into to a single word. The lowest and highest significant bits of the word can then be removed. This process removes the bits of the combined word which represent noise and which are likely to differ between samples of the same user, and also removes the bits of the combined word which are likely to be the same for many or all users and therefore are of less value in deriving a unique code.

The number of lowest significant bits removed and the number of highest significant bits removed can be selected based on an analysis of a word formed from mean feature values for samples obtained from a number of distinct subjects during a system calibration and combined using the same fold operation. Thus, a system calibration is used to determine the mean feature values for a (preferably) large sample, and the parts of the combined word which represent deviations of the particular user from the mean are used for the unique code.

The initial calibration phase may comprise:
obtaining multiple calibration samples form multiple users;
analysing the calibration samples and obtaining feature values for the samples; and
obtaining mean, variance and covariance values for the different features from the plurality of samples.

Preferably, the calibration also includes obtaining de-correlated normalised feature values for each feature; and calculating the optimal bits which uniquely identify the subject to extract from the a single word which combines all the features from the samples provided.

The invention also provides a method of generating an encryption key, comprising generating a code from a biometric sample using the method of the invention as claimed in any preceding claim and using the code to form an encryption key. This method is then used in an encryption method The method can be implemented by a computer program.

The invention also provides a system for generating a code from a set of biometric samples, comprising:
means for analysing a plurality of samples and obtaining feature values for the samples, each sample being interpreted as a plurality of features;
processing means for:
calculating mean and variance values for the different features from the plurality of samples;
setting quantization levels for each feature using the obtained mean and variance values together with the sample data, the quantization levels determining the range of feature values to be considered as equivalent;
normalising the feature values by adapting the feature values such that they may each take only a predetermined range of values, each with substantially equal likelihood; and
deriving a single code from a combination of the feature values, wherein the single code comprises a sub-set of the bits derived from the combination of feature values.

BRIEF DESCRIPTION OF THE DRAWINGS

An example of the invention will now be described in detail with reference to the accompanying drawing which is a flowchart to illustrate the method of the invention

DETAILED DESCRIPTION

The invention provides a method of generating a code from, typically, a biometric sample, in such a way that the code is unique to each sample and is the same for different samples from the same user.

The method steps are shown in the FIGURE, which will first be outlined briefly, before a detailed description of the processes used at the different stages.

The process uses an algorithm which includes statistical data about the general user population, and this is obtained in a calibration stage 10 (carried out once) before the user data is analysed in the stage 12.

The calibration stage 10 involves obtaining multiple calibration samples ("inter sample data") form multiple users (step 14), analysing the calibration samples and obtaining feature values for the samples (step 16). After normalisation in step 18, which makes the feature values have the same ranges of values, mean, variance and co-variance values for the different features are obtained in step 20.

The mean and variance values are used for the quantisation of the pattern data (described below) which defines how the captured data is mapped to different discrete values, and the co-variance values are used to enable de-correlation of the feature values. This de-correlation is applied to the inter sample data in step 22, to define feature values which are independent of each other.

The de-correlated inter sample data is used to derive a so-called baseline number. This is a one dimensional number representing the collapse of the de-correlation mean feature values into a single number. As will be explained further below, the calibration phase uses this baseline number to determine which parts of a collapsed de-correlated feature vector for an obtained pattern sample are to be used for code generation. In particular, this baseline number is used to work out which parts of a pattern sample can provide a unique and repeatable code for a specific pattern. This is shown as step 24.

The way the baseline number is used is discussed further below in connection with feature combination from samples taken.

The calibration stage 10 thus enables the general mean and variance values to be obtained, and also enables a de-correlated set of feature values to be obtained using co-variance values. The benefit of this (as will be described below) is that the set of de-correlated feature values using the mean feature values are of the same form as the data which is derived from the individual user data in the stage 12.

The data analysis stage 12 comprises the steps of obtaining user data from a single user in step 30, but in the form of multiple samples (typically 2 to 10 samples). The feature values are obtained in step 32 and these are again normalised in step 34. Mean, variance and co-variance values for the different features from the plurality of samples for the one user are obtained in step 36, and these are termed "intra-sample" values below.

These values are de-correlated in the same way as for the mean feature data, in step 38, and quantization levels for each feature are set using the obtained mean and variance values in step 40. The quantization determines which low level bits to throw away, and the quantization levels thus determine the range of feature values to be considered as equivalent.

A single code is derived from a combination of the de-correlated feature values in step 42.

The quantization takes account of the means and variances so that multiple samples from the same user will tend to give the same feature values. The combination of the de-correlated values provides further processing to eliminate differences in the code which result from different samples of the same user.

One primary application that the system possesses is for template-free biometric encryption, but the invention is more generic and relates more generally to the mapping of abstract pattern feature values to a unique sequence (code) of binary digits.

Pattern recognition systems operate by detecting component features of patterns which allow them to be associated with a given group of patterns known generically as a class. For example, identifying handwritten characters may be considered. The source patterns would be the characters written by a given subject, the features could be components of the pattern, such as horizontal and vertical lines (although many features in practice are more abstract than this) and the pattern classes would be the characters 'A', 'B', 'C' etc.

The pattern recognition process is the algorithm for mapping a given pattern supplied by a subject to a pattern class. i.e. identifying which letter the subject has written. The system operates by performing feature extraction (determining if the handwritten squiggles provided contain horizontal lines, vertical lines etc) and calculating which pattern class is most likely to contain the given set of features (a character with three horizontal lines and one vertical line is very likely, although not certain, to be an 'E').

This invention is not concerned specifically with the pattern recognition system itself, but is instead a technique for taking the feature values subsequent to extraction from the source pattern and mapping them into a unique key, which is termed below as a "basis number", and this is a unique code for the user.

This invention is also independent of the pattern features themselves and does not deal with the feature extraction process. However, the practical application of the invention is dependent on a good set of features being extracted from the source pattern. This is of course the case for any pattern recognition system.

Before describing the way the invention operates, some definitions are useful:

Source Pattern: The binarised digital input presented to the system by a particular subject. For a biometric based system, these would consist of data relating to fingerprints, signatures, voice prints etc depending on the modality (type of biometric) being used.

Feature/Feature Vector: Component values extracted from the source pattern used as the basis of further processing. Each feature is represented as a single number and the set of values for every feature forms a vector of values known as the Feature vector.

Inter-sample mean vector: The system is initially calibrated using a number of sample users each providing examples of the source patterns in stage 10. The relevant feature set for every pattern is extracted and the arithmetic means for each feature value calculated together with the variance. These are standard calculations defined by:—

$$\text{mean } \mu_r = \frac{\sum x}{n}$$

$$\text{variance } \sigma_r^2 = \frac{\sum (x - \mu_r)^2}{n}$$

where x represents the sample feature values and n represents the total number of samples.

Intra-sample means: The intra-sample mean values are analogous to the inter-sample means except that the sample source patterns are taken from only one subject. These values will be calculated from the run-time samples provided by the users in the stage 12. These are standard calculations for a user i defined by:—

$$\text{mean } \mu_{ia} = \frac{\sum x_i}{n_i}$$

$$\text{variance } \sigma_{ia}^2 = \frac{\sum (x_i - \mu_{ia})^2}{n_i}$$

where $x_i$; represents the sample values from user i and $n_i$ represents the total number of samples provided by user i.

Covariance matrix: The co-variance between two feature values provides a measurement of the correlation between the values. A positive co-variance indicates a positive correlation (one feature value will tend to increase as the second increases), a co-variance of 0 indicates independent features (an increase in one feature value has no influence on the second) and a negative co-variance indicates an inverse correlation (one feature value will tend to increase as the second decreases). The covariance between two feature $x_1$ and $x_2$ for T samples is given by:

$$\sigma_{12} = \frac{1}{T_i} \sum_{h=1}^{T_i} (x_{1h} - \mu_1)(x_{2h} - \mu_2)$$

The covariance matrix is a matrix containing all possible co-variances for the set of chosen features. This is represented by:—

$$\sum = \begin{bmatrix} \sigma_{11} & \cdots & \cdots & \sigma_{1N} \\ \vdots & \ddots & & \vdots \\ \vdots & & \ddots & \vdots \\ \sigma_{N1} & \cdots & \cdots & \sigma_{NN} \end{bmatrix}$$

Basic Operation

As outlined above, the system is divided into two major stages, a calibration phase employed once at the commencement of operation and a code generation phase employed whenever a user requires a key to encrypt or decrypt some data. These stages will now be described in more detail.

Calibration Phase

Prior to operation, a decision is made as to the pattern recognition task (typically biometric modality; fingerprint, signature etc) on which the system will operate and the precise feature set to be used for the chosen modality. This phase will need to be repeated for each modality, feature set and possibly for each capture device (e.g. fingerprint scanner) to be employed. The latter condition is due to device specific properties which may influence system operation.

When obtaining the user samples to calibrate the system, the precise number of samples for each user is dependent on the modality under consideration due to differences in their stability (fingerprints are more stable than signatures for example) although the more samples the better the resulting system performance.

The normalisation of the values involves generating mapping vectors, as described further below, and the de-correlation operation is also detailed below in the description of the data analysis stage.

Data Analysis Stage

This stage maps samples from a user into a number, known as the basis number, which may subsequently be used as the basis of encryption key generation using established encryption algorithms.

The required number of samples obtained from the user in step 30 from which features are extracted may for some modalities be as few as three, but other modalities may require more. System reliability increases as the number of samples increase.

Feature Normalisation (Step 34)

The features employed in a pattern recognition system may take on a diverse range of forms from characteristics of a written pattern such as height and width to dynamic features relating to the movements performed to produce a given signature. The values and value ranges of features are hence primarily governed by the characteristics of the features themselves and therefore, necessarily, the absolute value of features alone possesses little semantic value when considered in relation to other features (the value "3" in absolute terms, possesses little meaning as two features with the value "3" may not in any way be considered equal).

Since the underlying purpose is to combine feature values, it is necessary to normalise feature values onto a given linear scale in order that their absolute value has some comparable meaning. The effect of this process will be to render each feature as equally significant. A significant property of the system of the invention is that weighting (in the sense of allocation of importance to feature values) is handled implicitly within the feature combination phase 42 of the algorithm as will be apparent below.

If a feature offers little useful contribution to the generation of the basis number, it will implicitly contribute little to the result without requiring this fact to be previously deduced in the normalisation stage.

Two forms of normalisation may be identified.

The first form is to ensure that the feature values are discrete as continuous values cause problems in defining equality. Many features will already be discrete and do not require this step in the process. Those that are not need an initial quantising operation applied. The potential non-linear distribution of potential values along the scale is not significant at this stage as this is catered for during the subsequent phase. However, intervals must be defined and the calculated values must be mapped onto these intervals. The exact intervals are particular to a particular feature and the divisions need not be equal in magnitude. They are defined individually for each feature although it should be emphasised that many features are already discrete. These intervals are cached for each feature.

The second form is to normalise the feature in terms of the fixed range of values they may take and to equalise the likelihood of these values occurring. (This problem is analogous to flattening a grey level histogram). A range of integer values is defined parameterised on the values min and max. These are defined specifically for each modality, feature set and potentially device, although in practice they need not vary greatly.

Each feature is normalised to the same set of values. For each feature in the system, a mapping vector is defined for the actual set of values (A) to the normalised set of values (N) for each sample in the training set where a given actual value a is mapped to a normalised value n by:—

$$n = \left(\frac{max - min}{T}\right) |A_i \cdot A_i < a|.$$

where T represents the total number of training samples and $|A_i \cdot A_i < a|$ represents the total number of all samples possessing a value less than a.

In the above equation, the median value of the range of sample values will map onto the median of the range of values from min to max. In a normal distribution (which will be the case for many features), the mean, mode and median will tend to be coincident and the above equation is sufficient. For non-normal distributions, especially bi and multi-modal distributions, an alternative approach is implemented.

For each of these distributions, a bespoke mapping vector may be defined. For multi-modal distributions, each of the component modes may be mapped to the same normalised value with associated values to the localised means mapped to slight variations to this normalised means. For a simplistic example, a bi-modal feature with distributions modes centred on the values 10 and 20 could have both the values 10 and 20 mapped to the normalised value n. 11 and 21 could then be mapped to n+1 and 9 and 19 to n−1. Although the optimal mapping will be feature dependent, the ability to fine tune individual feature normalisation mappings is a benefit as it allows features with unusual distributions to be efficiently incorporated within the system.

Dynamic Feature Quantisation (Step 40)

A fundamental required property of the system is that the same basis number results from each sample. However, (biometric) pattern samples will always contain variations (a person's signature is not exactly the same twice). It is therefore necessary to treat small variations in feature values as if they represent the same value in order to compensate for this. The process of grouping sets of similar feature values into the same resulting value is quantisation. The major question is in determining where the boundaries between quantisation intervals lie, as small variations in a value close to a boundary will lead to differing resulting quantised values. In a template based system, the average value for a feature for a given user may be determined and variations on this value based on the intra-sample variance employed to create quantisation intervals.

In the system of the invention, the intra-sample means and variances must be dynamically recreated each time as no record is kept of previous samples and the quantisation intervals determined dynamically usually with a reduced sample set. The variations are thus more error prone and the algorithm must be able to compensate for this. The procedure is as follows:—

For each normalised feature, static quantisation intervals are defined based on the inter-sample means and variances (i.e. those obtained from the calibration phase).

In practice, for many features the default normalised values of the features may be employed as quantisation intervals as they form natural increments. Some features require re-evaluation of the number of intervals at this stage. (These are cached values).

For the provided samples from the user, the intra-sample mean $\mu_{ia}$ and variance $\sigma_{ia}^2$ are calculated The intra-sample mean determines the expected value for the feature and the intra-sample variance will give an indication of how far it is likely to deviate from the mean.

The intra-sample variance $\sigma_{ia}^2$ is then used to dynamically cluster the static inter-sample quantisation intervals to reduce the resolution available in the potential feature values.

Intuitively, if the variance is large, fewer significant bits are allocated to the resulting feature value. The inter-sample variance $\sigma_r^2$ also plays a role as this determines the general pattern of variation expected from the given feature (if the intra sample variance $\sigma_{ia}^2$ was accurate, the inter sample value $\sigma_r^2$ would not be required but since $\sigma_{ia}^2$ is approximate, some guidance regarding what it is likely to be is useful).

The exact algorithm is parameterised on a quantisation safety margin qsm and is as follows:—

Calculate an equivalence interval given by:—

$$ival = \mu_{ia} \pm qsm\left(\frac{\sigma_r}{\sigma_{ia}}\right)\sigma_{ia}$$

This value will determine a range of values covering the default intervals of the feature.

The value assigned to the feature is the set of bits which are common to all the default intervals right padded with zeros to create the correct feature word length. e.g. for an (abnormally small) 3 bit feature word length, if the value assigned by the sample is 110 and the ival range covers an additional interval each side, the values covered would be 101, 110 and 111 resulting in an assigned value of 100, the common first bit padded with two zeros. The number of bits in the feature word is sufficient to represent the normalised quantised feature intervals max–min.

The quantization thus aims to ensure that the feature values for all samples will be mapped to the same end result, by taking account of the inter and intra sample variances.

The optimal value of qsm is dependent on the modality of the biometric.

The problem of dynamic partitioning and quantising may be viewed as a problem in n-dimensional feature space for n features. Treating the features independently and joining the quantised values will not be stable for a significant number of features Each feature has a mean and variance. The inter-sample feature means will define a point in the n-dimensional feature space and the variances will guide the distributions in the various dimensions around the means (some features may have distributions—e.g. bi or multi-modal, which change this slightly but the principle is basically true). The intra-sample means (means calculated from samples given by one person) will define separate points in the space and the vector between the inter and intra sample means provides a basic "biometric signature" for a given subject. This vector then forms the basis for the key generation system but there are problems:—

Correlations

Feature correlations (which can roughly be thought of as the tendencies of the individual subject vectors to point in the same direction—most easily seen when viewed in a reduced dimensional space) must be removed. The fundamental reason behind this is that potential codebreakers may employ correlations to estimate the generated key value. Ideally, the potential keyspace (in this context, this may be considered to be the possible range of basis numbers) should be fully utilised and unpredictable in the sense that each key should be approximately equally probable.

If the potential keys may not occur with equal probability, it presents a route by which the system may be attacked in that knowledge or assumption regarding the value of one feature could be used as a guide in the estimation of the values of nominally unrelated features. If not all keys are equally probable, then attacking the system by starting with the most probable values is potentially beneficial.

Essentially what is required is for the basis numbers to be as unpredictable as possible. To achieve this, de-correlating the features as fully as possible is required. This comprises the adjustment of feature values so that any component which relies on another feature is removed. One way to achieve this is to use covariance values, and these are obtained in steps 20 and 36 as mentioned above.

For each pattern feature, a co-variance matrix is generated as defined above using the normalised feature values.

For each feature, a de-correlating coefficient is defined by summing the co-variances (excluding the variance which is on the leading diagonal) and taking the square root. This is done as the coefficient will be one order too high otherwise. The definition of the co-efficient K for a feature f is given by $$\kappa_f = \sqrt{\left(\sum_{j=1}^{N}\sigma_{fj}\right) - \sigma_{ff}}$$

which may be combined to form a vector.

This proposition works as all feature values are combined to form a working encryption key, therefore any remaining positive correlations will be compensated by negative correlations resulting in a neutral unbiased basis number. The normalisation of the features also allows this to occur as all variances are calculated on the same order of number.

Strictly, the equation should be parameterised using a "folding function" explained below, rather than a summation. In this case the equation becomes:—

$$\kappa_f = \sqrt{fold^{-1}\left(\left(\underset{j=1}{\overset{N}{fold}}(\sigma_{fj})\right), \sigma_{ff}\right)}$$

where "fold" is the folding function and $fold^{-1}$ is the inverse of the folding function. In other words, the covariance values as used to compensate correlation offsets included by the folding function during the combination stage 42 which is explained below.

Feature Combination

This final phase comprises the collapsing of the feature vector onto a one-dimensional (basis) number, and utilises analogous techniques to the stabilisation of the intra-sample variances during quantisation. The numbers are combined using the folding function (which may for example be a simple summation), lower order bits are discarded and the components remaining number are represented in a code where component bits are equally significant.

In this way, the features are combined in the same way as the de-correlated inter sample data is combined to obtain the initial basis number, mentioned above. The actual basis number, which is then utilised for "traditional" encryption numbers such as RSA, will consist of a subset of bits within the initial basis number, the precise composition of which is deduced during the calibration stage as described below.

This calibration algorithm to determine the optimal subset of bits utilises the decorrelated, normalised feature vector for each given component subject $\kappa_i$ within the calibration set and the inter-sample mean vector $\mu_{ir}$ which is the global combination of all the inter sample mean values for the different features. In practice, the number of samples obtained from each subject within the calibration set will exceed the number obtained from a subject during the subsequent key generation phase.

The fundamental operation is to multiply the component values of the vectors and determine a stable set of bits for given users. The operation of the algorithm is as follows:—

Again as part of the calibration stage discussed above, a given parameterised fold operator (simple examples are addition or multiplication) is applied to the inter-sample mean vector $\mu_i$, to "flatten" the vector and form the baseline number bl. In practice, this value is cached for a given feature set, modality and device.

The same fold operator is folded into each of the decorrelated, normalised feature vectors for the given samples j from, in turn, each of the given subjects i within the calibration set (i.e. during calibration, a mock key generation sequence of operations takes place for each sample for each subject up until step 40), $\kappa_{ij}$. For each subject, these form the set of greater basis numbers $basis^\uparrow_j$. This is a set with one basis number for each sample given, and each basis number is of the same form as the baseline number bl.

The set $basis^\uparrow_j$ will be identical in the most significant bits but differ in the least significant bits due to variations within the sample input patterns representing the biometric modality in question.

It is thus necessary to drop bits of the basis numbers which diverge, so that a unique code can be obtained from different samples. As part of the calibration stage, a determination of the bits to be dropped is made by analysis of the extended user samples available within the calibration set.

This determination can be made by performing a bitwise comparison between all components of the calibration set of data, recording the point at which the bits first diverge for each user data set (the samples may need to be zero left padded initially to ensure they contain the same number of bits). This recorded position then needs to be left shifted by a safety factor known as the right-safety-margin. The function of the right-safety-margin is to ensure that similarities between samples are not coincidental and to allow for unusually similar samples which will not be reproduced by the user again in practice. The value of right-safety-margin is dependent on the biometric modality, capture device and the folding operation employed and is parameterised. The tradeoff is that the larger the value of the margin, the more stable the system becomes but the fewer significant bits will be present within the resulting basis number for the encryption keys.

The resulting single value will be the lesser basis number $basis^\downarrow_i$ (i.e. the sequence of identical bits at the beginning of each of the members of the set of greater basis numbers $basis^\uparrow_j$ is used to form the lesser basis number $basis^\downarrow_i$.) The discarded bits are effectively random noise which are of no value and may be discarded. The operation is performed for each subject within the calibration set and an optimal number of bits to be discarded on the right deduced. For maximum system stability, this will be the largest number for any subject although, in practice, a smaller number than this may be chosen to increase system security at the expense of making the system ineffective for the small number of subjects with larger discard sizes. The number of bits to be discarded on the right (right-margin) may now be cached for use during the key generation phase.

The component bits of $basis^\downarrow$, for each subject are compared with each other and with the baseline number bl to determine at what point they diverge. This effectively looks for the point at which sample values deviate from the baseline number (which is derived from mean values) as the bits which correspond the baseline number do not provide any useful encoding function.

The bits before divergence represent bits that are common for all users and therefore are not significant in generating a unique key for a given user. Again a separate left-safety-margin of bits is added is added by right-shifting this position, this time to avoid the condition where bits are often the same for most users but not always. The tradeoff in the size of the left-safety-margin is similar to the previous step. This time, the smaller the left-safety-margin, the more the keys within the keyspace become clustered due to bits being identical in most cases, the larger the left-safety-margin, the smaller the number of significant bits in the resulting basis number. In practice, the larger the number of subjects within the calibration set, the smaller the size of the left-safety-margin may be as confidence in the accuracy of the calibration data will be increased. Again the number of bits to be discarded (left-margin) is cached for use during the key generation stage. The resulting bits form a sequence which will be stable for a given user but distinct for differing users. The bits will still have increased stability towards the left (most-significant) side (i.e. errors are most likely to occur towards the right). The final operation to form the basis number for a given user, $basis_i$ is to randomise the order of the bit sequence using a randomising function parametrised to the system. It should be noted that this operation does not actually remove any keyspace clustering but merely acts to make it less detectable.

These calculations are performed using the calibration data set, which is also used to derive the baseline number, and the end result is to give rise to two parameters, the left-margin and the right-margin, which together define the subset of the bits to be extracted from the initial basis number for a given subject during the key generation phase. Thus, a fixed number of bits can be extracted at the key generation phase from the basis number generated from the one sample (or small number of samples for a given subject).

The potential application domains for the technology are wide. Sample specific application domains include:—
  (Multimedia) Document Security (text, images, video, audio)
  Mobile Communications, including communication to/from mobile phones, network security and user Validation
  DVD/Software copyright protection It will apparent from the above description that the invention provides an algorithm for the generation of a unique set of binary digits (bits) from abstract feature values taken from source binary inputs (patterns) presented to the system. One primary application is to take feature samples taken from biometric samples provided by given subjects and map them into a unique number which may form the basis for the generation of encryption keys.

The invention is not however limited to any specific pattern features or subsequent encryption algorithms.

The processing of the invention will in practice be implemented as a computer program which is used in combination with imaging hardware for capturing the sample pattern.

An encryption system using the method of the invention does not require any memory for biometric data of the users of the system, and even for the calibration data, only the data means, variance and covariance values need to be stored, which do not give any information about individual users.

The combination process essentially implements a weighted feature combination, but without the need to allocate different weights to different features.

The subsequent encryption has not been described in detail, but this can for example involve the generation of primes for RSA encryption.

The invention claimed is:

1. An encryption and decryption method comprising configuring at least one processor to perform the functions of:
    generating a code from a set of biometric samples, each sample in the form of a pattern, the code generating comprising:
        analysing a plurality of samples and obtaining feature values for the samples, each sample being interpreted as a plurality of features of a previously defined feature set obtained during an initial calibration;
        normalising the feature values by adapting the feature values such that they may each take only a predetermined range of values, each with substantially equal likelihood;
        obtaining mean, variance and covariance values for the different feature values from the plurality of samples;
        setting quantization levels for each feature using the obtained mean and variance values, the quantization levels determining the range of feature values to be considered as equivalent;
        de-correlating the feature values using de-correlating coefficients obtained from the covariance values; and
        deriving a single code from a combination of the de-correlated feature values, wherein the single code comprises a sub-set of the bits derived from the combination of feature values;
    using the code to form a private encryption key;
    using the private encryption key to encrypt data;
    decrypting the encrypted data by taking a further biometric sample to generate the required private key, wherein the method is template-free having no physical record of the private key or any form of information regarding the biometric itself;
    wherein the initial calibration phase for determining said previously defined feature set comprises:
        obtaining multiple calibration samples from multiple users;
        analysing the calibration samples and obtaining feature values for the samples; and
        obtaining mean, variance, and covariance values for the different features from the plurality of samples, wherein those mean and variance values are used in setting static quantization intervals used to re-create each time dynamically said mean and variance values of said code generating phase.

2. A method as claimed in claim 1, wherein the normalising comprises applying a quantization to feature values which have continuously variable values.

3. A method as claimed in claim 1, wherein deriving a single value comprises:
    obtaining a de-correlated feature value for each feature; and
    combining the de-correlated feature values by:
        performing a summing operation to combine the de-correlated feature values into a single word;
        removing the lowest significant bits of the word; and
        removing the highest significant bit of the word.

4. A method as claimed in claim 3, wherein the number of lowest significant bits removed and the number of highest significant bits removed is selected based on an analysis of a word formed from mean feature values for samples obtained during a system calibration and combined using the same summing operation.

5. A method as claimed in claim 1, wherein the calibration phase further comprises obtaining a de-correlated normalised feature value for each feature.

6. A method as claimed in claim 5, further comprising normalising the feature values before obtaining mean and co-variance values.

7. A method as claimed in claim 6, wherein the mean and variance values from the calibration phase are used in setting the quantization levels.

8. A non-transitory machine-readable medium having stored therein a computer program which when run on a computer performs the method as claimed in claim 1.

9. An encryption and decryption system, comprising:
    a system for generating a code from a set of biometric samples, comprising a processor configured to:
        analyze a plurality of samples and obtain feature values for the samples, each sample being interpreted as a plurality of features of a previously defined feature set obtained during an initial calibration;
        calculate mean and variance values for the different features from the plurality of samples;
        set quantization levels for each feature using the obtained mean and variance values together with the sample data, the quantization levels determining the range of feature values to be considered as equivalent;
        normalise the feature values by adapting the feature values such that they may each take only a predetermined range of values, each with substantially equal likelihood;
        derive a single code from a combination of the feature values, wherein the single code comprises a sub-set of the bits derived from the combination of feature values;
        use the code to form a private encryption key;
        use the private encryption key to encrypt data;
        decrypt the encrypted data by taking a further biometric sample to generate the required private key;
        wherein the method is template-free having no physical record of the private key or any form of information regarding the biometric itself;
    wherein the processor is further configured to perform the initial calibration phase for determining the previously defined feature set by:
        obtaining multiple calibration samples from multiple users;
        analysing the calibration samples and obtaining feature values for the samples;
        obtaining mean, variance and covariance values for the different features from the plurality of samples, wherein those mean and variance values are used in setting static quantization intervals used to re-create each time dynamically said mean and variance values calculated by said system for generating a code.

* * * * *